(12) United States Patent
Hutton (10) Patent No.: US 7,069,613 B2
(45) Date of Patent: Jul. 4, 2006

(54) METHOD AND APPARATUS FOR ALIGNING AN AIRCRAFT WITH A PASSENGER LOADING BRIDGE

(75) Inventor: Neil Hutton, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 10/879,089

(22) Filed: Jun. 30, 2004

(65) Prior Publication Data

US 2004/0237224 A1  Dec. 2, 2004

Related U.S. Application Data

(62) Division of application No. 10/627,778, filed on Jul. 28, 2003, now Pat. No. 6,772,464.

(60) Provisional application No. 60/400,785, filed on Aug. 5, 2002.

(51) Int. Cl.
*B64F 1/31* (2006.01)

(52) U.S. Cl. .......................... 14/71.5; 700/13; 340/958

(58) Field of Classification Search ................ 14/69.5, 14/71.1, 71.3, 71.5, 71.7; 340/945, 948, 340/951, 958; 700/13

See application file for complete search history.

(56) References Cited

U.S. PATENT DOCUMENTS

| | | | |
|---|---|---|---|
| 3,599,262 A * | 8/1971 | Carder et al. ................. 14/71.5 |
| 4,358,721 A * | 11/1982 | Farr ............................ 318/604 |
| 4,464,648 A * | 8/1984 | Smith et al. ............. 340/932.2 |
| 5,226,204 A | 7/1993 | Schoenberger et al. |
| 5,295,212 A * | 3/1994 | Morton et al. ................. 385/57 |
| 6,324,489 B1 | 11/2001 | Millg.ang.rd |
| 6,390,757 B1 * | 5/2002 | Ganiere ....................... 414/391 |
| 6,552,327 B1 * | 4/2003 | Anderberg .................. 250/221 |
| 6,637,063 B1 * | 10/2003 | Hutton et al. ................. 14/71.5 |
| 6,742,210 B1 * | 6/2004 | Hutton et al. ................. 14/71.5 |
| 6,757,927 B1 * | 7/2004 | Hutton et al. ................. 14/71.5 |
| 6,762,694 B1 * | 7/2004 | Westlund .................... 340/958 |
| 2002/0017002 A1 * | 2/2002 | Sloan et al. .................. 14/71.1 |
| 2003/0057360 A1 * | 3/2003 | Anderberg .................. 250/221 |
| 2003/0120358 A1 * | 6/2003 | Hutton ........................ 700/13 |

FOREIGN PATENT DOCUMENTS

| | | | |
|---|---|---|---|
| EP | 803435 A1 | * | 10/1997 |
| WO | WO 96/08411 A1 | | 3/1996 |
| WO | WO 01/34467 A1 | | 5/2001 |

OTHER PUBLICATIONS

Fabriksmonteringin Trelleborg AB website: http://www.fmt.se (pages of particular relevance attached).

"APIS ++ Aircraft Parking and Information System" brochure, FMT Aircraft Gate Support Systems AB, Sweden.

* cited by examiner

*Primary Examiner*—Meredith Petravick
*Assistant Examiner*—Alexandra Pechhold
(74) *Attorney, Agent, or Firm*—Freedman & Associates (57) ABSTRACT

Disclosed is a method and system for aligning a door of an aircraft to a passenger loading bridge. A final parking position of the aircraft is defined as being immediately adjacent to a position of the passenger loading bridge, such that when the aircraft is stopped at the final parking position, the passenger loading bridge requires only a telescopic extension of less than about 1 meter to complete the alignment operation. To this end, an indicating device that works cooperatively with an aircraft-engaging end of the passenger loading bridge is provided for displaying human intelligible instructions for use by a pilot of the aircraft to guide the aircraft to the final parking position.

26 Claims, 10 Drawing Sheets

METHOD AND APPARATUS FOR ALIGNING AN AIRCRAFT WITH A PASSENGER LOADING BRIDGE

This application is a divisional application of U.S. patent application Ser. No. 10/627,778 filed Jul. 28, 2003 now U.S. Pat. No. 6,772,464, which claims the benefit of United States Provisional Application No. 60/400,785 filed Aug. 5, 2002.

FIELD OF THE INVENTION

The present invention relates generally to passenger loading bridges and more particularly to a method and apparatus for aligning an aircraft with a passenger loading bridge.

BACKGROUND OF THE INVENTION

In order to make aircraft passengers comfortable, and in order to transport them between an airport terminal building and an aircraft in such a way that they are protected from the weather and from other environmental influences, passenger loading bridges are used which can be telescopically extended and the height of which is adjustable. For instance, an apron drive bridge in present day use has a plurality of adjustable modules, including: a rotunda, a telescopic tunnel, a bubble section, a cab, and elevating columns with wheel carriage. Of course, other types of bridges are known in the art, such as for example nose loaders and pedestal bridges.

Unfortunately, the procedure for aligning the passenger loading bridge with a doorway of the aircraft is a time consuming operation. First, the pilot taxis the aircraft along a lead-in line to a final parking position within the gate area. Typically, the lead-in line is a physical marker painted onto the tarmac, and it is used for guiding the aircraft along a predetermined path to a final parking position. Additional markings in the form of stop lines, one for each type of aircraft, are provided at predetermined positions along the lead-in line. Thus, when the nose gear of a particular type of aircraft stops precisely at the stop line for that type of aircraft, then the aircraft is at its final parking position. Of course, the pilot's view of the tarmac surface from the cockpit of an aircraft is limited. This is particularly true for larger aircraft, such as a Boeing 747. Typically, therefore, the pilot relies upon instructions provided by one of a human ground marshal together with up to two "wing walkers", and an automated docking guidance system to follow the lead-in line. Alternatively, stop bars are located on a pole that is fixedly mounted to the ground surface, including appropriate stop bars for each type of aircraft using the gate. Further alternatively, a tractor or tug is used to tow the aircraft along the lead-in line to its final parking position.

Secondly, the passenger loading bridge is aligned with the parked aircraft, which in the case of an apron drive bridge may involve extending the bridge by 10 to 20 meters or more. Driving the bridge over a long distance is very time consuming because often the rate at which the bridge is moved is limited in order to reduce the risk of colliding with ground service vehicles or personnel, and to avoid causing serious damage to the aircraft in the event of a collision therewith. Manual, semi-automated and fully-automated bridge alignment systems are known for adjusting the position of the passenger loading bridge relative to the parked aircraft.

Manual bridge alignment systems typically are preferred by the airlines because a trained bridge-operator is present and is able to observe directly the movements of the bridge relative to the parked aircraft. The bridge-operator uses a control panel located within the cab section to adjust the bridge each time an aircraft arrives. Accordingly, the probability that the bridge will collide with a parked aircraft during an alignment operation is relatively small. Unfortunately, the time that is required to align the passenger loading bridge with the parked aircraft is greatest with a manual alignment system, which translates directly into longer turnaround times for the airlines and increased passenger inconvenience. Additional delays may also occur from time to time with a manual bridge alignment system, for instance in the event that the aircraft stops at its final parking position before the bridge-operator arrives. It is a disadvantage of the manual bridge alignment systems that bridge-operators must be employed and trained to operate the system, which increases operating costs. It is a further disadvantage of the manual bridge alignment systems that operator experience and/or caution may further limit the speed at which the passenger loading bridge is actually moved.

Semi-automated bridge alignment systems are also known, whereby the bridge is moved rapidly to a preset position under the control of a computer. WO 96/08411, filed Sep. 14, 1995 in the name of Anderberg, describes a semi-automated system for controlling the movement of a passenger loading bridge. When an aircraft has landed, a central computer transmits information on the type of aircraft to a local computer of the passenger loading bridge at an assigned gate. The local computer accesses a database and retrieves information on the positions of the doors for the type of aircraft that has landed, as well as information on the expected final parking position for the type of aircraft at the assigned gate. The local computer uses the retrieved information to determine an absolute position of the door with which the bridge is to be aligned. Accordingly, the passenger loading bridge is moved under computer control to a position close to the determined position of the door, for example within 2–10 meters. Optionally, the bridge is preset to this position before the aircraft has stopped moving.

WO 01/34467, filed Nov. 8, 2000 also in the name of Anderberg, teaches that the above system is reliable only for movement to a position close to the parked aircraft. Thus, the bridge has to be operated manually during the remaining 2–10 meters of its movement. The WO 01/34467 reference also teaches an improvement to the above system, in which electromagnetic sensors are disposed along the outboard end of the passenger loading bridge for transmitting a set of electromagnetic pulses in different directions and for detecting electromagnetic pulses after reflection from an aircraft. Based on the elapsed time between transmitting and detecting the electromagnetic pulses in different directions, a profile of distance as a function of direction is obtained. From the measured distance versus direction profile and the information stored in the computer, it is then possible to maneuver the bridge the rest of the way from the preset position to the door of the parked aircraft. Unfortunately, when the aircraft fails to stop at the expected final parking position, the preset position will be misaligned with the actual position of the aircraft door, and human intervention will be required in order to complete the alignment operation.

Other automated systems have been proposed, for instance an automatic loading bridge which uses video cameras in the control of the bridge as described by Schoenberger et al. in U.S. Pat. No. 5,226,204. The system uses the video cameras to capture images of an aircraft to which the bridge is to be aligned, which images are provided to a computer for image processing. An object of the image processing is to locate doors along the lateral surface of the aircraft facing the passenger loading bridge. The bridge is then moved automatically in a direction toward a predetermined door of the parked aircraft. Unfortunately, the system described in U.S. Pat. No. 5,226,204 suffers from several disadvantages. For instance, a very sophisticated image processing system is required to locate a door along the side of an aircraft from a distance of up to 15 meters or more. Factors such the weather, ambient lighting conditions and the presence of intervening ground support vehicles may also become very significant over such a large distance. Furthermore, the bridge still is required to move a significant distance during the alignment operation, which requires a finite amount of time and poses a hazard to ground service vehicles and personnel.

Thus, it has been a continuing problem to provide a bridge alignment system which is capable of safely and reliably aligning a passenger loading bridge with an aircraft. In addition, there has been a long-standing, unfulfilled need for a bridge alignment system which reduces the amount of time that is required to complete each bridge alignment operation.

In view of the limitations of the prior art alignment systems discussed above, it is an object of the instant invention to provide an alignment system for aligning a door of an aircraft to a passenger loading bridge.

It is another object of the instant invention to provide an alignment system which reduces the amount of time that is required to complete each bridge alignment operation.

SUMMARY OF THE INVENTION

In accordance with an aspect of the instant invention there is provided a method for aligning a passenger loading bridge having an aircraft-engaging end to a doorway of an aircraft, comprising the steps of: guiding the aircraft toward the aircraft-engaging end of the passenger loading bridge; providing a human intelligible indication for indicating a parking position of the aircraft, the human intelligible indication being dependent upon a position of the aircraft-engaging end of the passenger loading bridge, such that substantially varying the position of the aircraft-engaging end of the passenger loading bridge results in a substantial variation in the parking position of the aircraft; stopping the aircraft at the parking position in dependence upon the human intelligible indication, such that the doorway of the aircraft is substantially aligned with the aircraft-engaging end of the passenger loading bridge; and, adjusting the passenger loading bridge to move the aircraft-engaging end into an aircraft engaging condition.

In accordance with another embodiment of the instant invention there is provided a method for aligning a passenger loading bridge having an aircraft-engaging end to a doorway of an aircraft, comprising the steps of: determining a type of the aircraft; determining a desired parking position for the determined type of the aircraft; moving the aircraft-engaging end of the passenger loading bridge to a position adjacent to the desired parking position; guiding the aircraft toward the aircraft-engaging end of the passenger loading bridge; providing a human intelligible indication for indicating the desired parking position of the aircraft, the human intelligible indication being dependent upon the position of the aircraft-engaging end of the passenger loading bridge, such that substantially varying the position of the aircraft-engaging end of the passenger loading bridge results in a substantial variation in the parking position of the aircraft; stopping the aircraft at the desired parking position in dependence upon the human intelligible indication, such that the doorway of the aircraft is substantially aligned with the aircraft-engaging end of the passenger loading bridge; and, adjusting the passenger loading bridge to move the aircraft-engaging end into an aircraft engaging condition.

In accordance with another embodiment of the instant invention there is provided a method for aligning a passenger loading bridge having an aircraft-engaging end to a doorway of an aircraft comprising the steps of: determining a type of the aircraft; selecting a desired parking position for the determined type of the aircraft from a plurality of allowed parking positions for the determined type of the aircraft in the vicinity of the passenger loading bridge; moving the aircraft-engaging end of the passenger loading bridge to a position immediately adjacent to the desired parking position; guiding the aircraft toward the aircraft-engaging end of the passenger loading bridge; providing a human intelligible indication for indicating the desired parking position of the aircraft, the human intelligible indication being dependent upon the position of the aircraft-engaging end of the passenger loading bridge, such that substantially varying the position of the aircraft-engaging end of the passenger loading bridge results in a substantial variation in the parking position of the aircraft; stopping the aircraft at the desired parking position in dependence upon the human intelligible indication, such that the doorway of the aircraft is substantially aligned with the aircraft-engaging end of the passenger loading bridge; and, adjusting the passenger loading bridge to move the aircraft-engaging end into an aircraft engaging condition.

In accordance with another aspect of the instant invention there is provided a system for aligning a passenger loading bridge to a doorway of an aircraft comprising: a passenger loading bridge having an aircraft-engaging end for being aligned with the doorway of the aircraft; an alignment indicator for indicating a stopping position of the aircraft; a controller in electrical communication with the passenger loading bridge and with the alignment indicator for determining a human intelligible indication to be displayed by the alignment indicator in dependence upon a position of the aircraft-engaging end of the passenger loading bridge, wherein the stopping position of an aircraft of a same type changes with changes in the location of the aircraft-engaging end of the passenger loading bridge.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. For instance, the drawings and the detailed description of the invention are presented in terms of a particular application in which an apron drive bridge is used by way of a specific example. It is to be understood that other types of passenger loading bridges, for instance nose loaders, pedestal bridges, radial drive bridges etc. are also envisaged for use with the instant invention.

Figure 1:
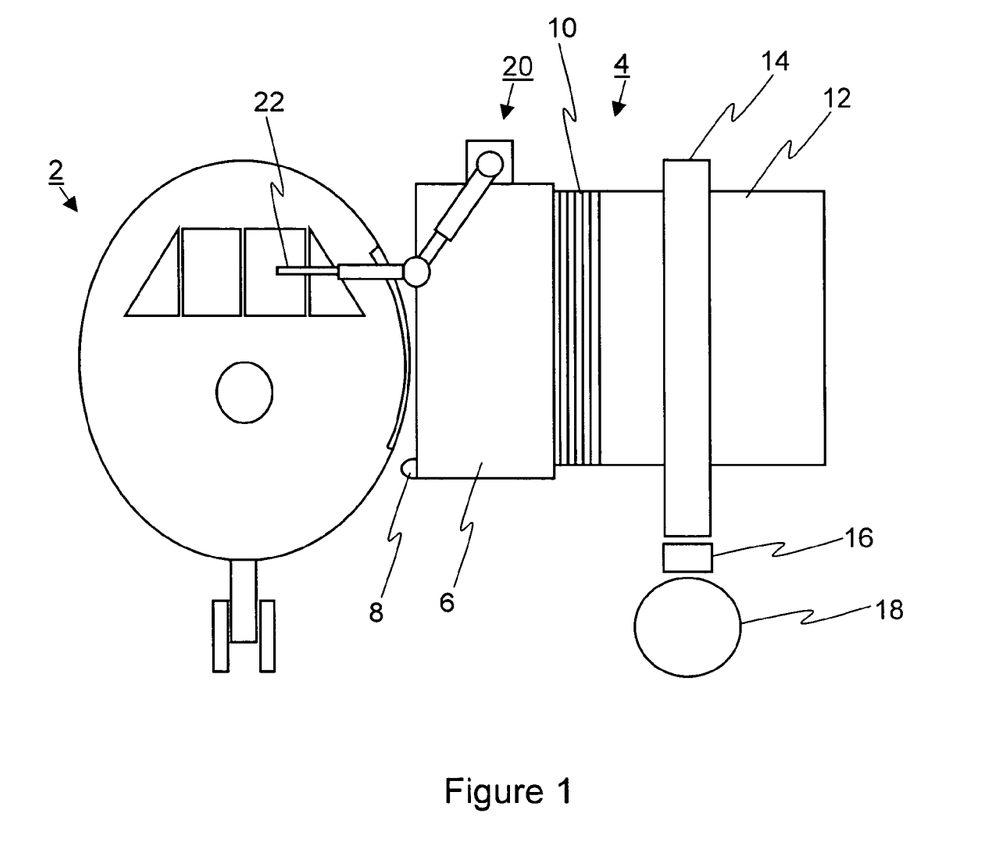
FIG. 1 is a simplified side view of an apparatus according to a first embodiment of the instant invention.

Referring to FIG. 1, shown is a simplified side view of an apparatus according to a first embodiment of the instant invention. An aircraft 2 is shown in an aligned condition with a passenger loading bridge 4. The passenger loading bridge 4 includes a cab 6 having a bumper 8 disposed along an outboard edge of a floor member thereof. The cab 6 is pivotally mounted to an outboard end of a passageway 12 via a bubble section 10. The passageway 12 includes inner and outer passageway elements (not shown), wherein the inner element is telescopically received within the outer element such that the length of the passageway 12 is variable. Of course, each passageway element includes a left sidewall, a right sidewall, a floor member and a ceiling member. Optionally, a number of passageway elements other than two is provided. The passageway 12 is also connected at an inboard end (not shown) to a terminal building (not shown) via a rotunda (not shown) for supporting pivotal movement of the passageway 12.

The passageway 12 is suspended near the outboard end by a frame 14 for adjusting the height of the passenger loading bridge 4. Furthermore, the passenger loading bridge 4 includes a wheel carriage 16 with driving wheels 18 for achieving angular displacement of the passenger bridge as well as telescoping of the inner and outer passageway elements to alter the length of the passageway 12.

The instant invention provides an indicating device 20 for assisting the pilot as the aircraft 2 is taxied to a final parking position that is adjacent to the cab 6. Of course, the passenger loading bridge 4 is a moveable structure, such that the position of the cab 6 varies with time. It is therefore a feature of the instant invention that the indicating device 20 is dynamic in nature. Stated differently, the use of permanent markings on the tarmac surface and/or visual guidance docking systems that are fixed in position is precluded because the aircraft 2 is not constrained to follow a predetermined trajectory toward its final parking position.

Referring again to FIG. 1, the indicating device 20 includes a wand 22 that is positionable at different locations relative to the cab 6. For example, the wand 22 is adjustably supported using a robotic arm. The indicating device 20 is preferably mounted to an outer surface of the passenger loading bridge 4, for instance an outer roof surface of the cab 6. In use, the wand is moved to a predetermined position such that it is directly in front of the pilot's windshield when the aircraft 2 is correctly aligned with the cab 6. To this end, a controller (not shown) is provided for controlling the motion of the robotic arm. For example, the controller is a computer in electrical communication with a flight information database of the airport terminal. Preferably, the controller is also in electrical communication with a drive mechanism (not shown) of the passenger loading bridge 4, for automatically positioning the cab 6.

Figure 2:
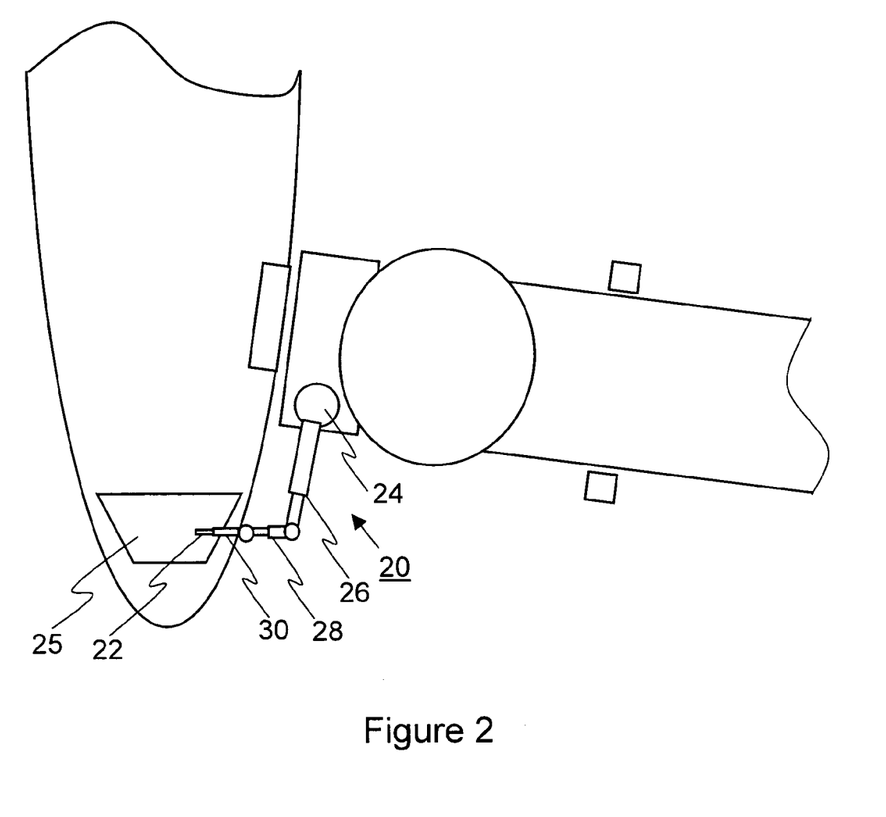
FIG. 2 is a simplified top view of the apparatus shown in FIG. 1.

Referring now to FIG. 2, shown is a simplified top view of the apparatus described with reference to FIG. 1. The indicating device 20 includes a base 24 for mounting the robotic arm to the outer roof surface of the cab 6. In the illustrated embodiment, the robotic arm includes a first telescopic portion 26 mounted at one end to the base 24, a second telescopic portion 28 pivotally attached at one end to the other end of the first telescopic portion 26, and a third telescopic portion 30 pivotally attached at one end to the other end of the second telescopic portion 28. The third telescopic portion 30 terminates at the wand 22, which preferably includes a soft and/or flexible tip to avoid causing damage to the aircraft windshield 25. Optionally, the wand 22 is illuminated and or brightly colored, so as to improve its visibility during operation under conditions of poor lighting and/or poor weather. Further optionally, the wand 22 includes a compact display device for providing human intelligible signals to the pilot for making fine adjustments to the trajectory of the aircraft. For instance, the compact display device is for displaying a left arrow to instruct the pilot to steer left, and a right arrow to instruct the pilot to steer right. Such a display is particularly advantageous during the final stages of the alignment operation.

In the illustrated embodiment of FIGS. 1 and 2, each telescopic portion of the robotic arm includes two telescoping members, one telescoping member received within the other such that the length of the telescopic portion is adjustable, and each pivotal attachment point supports rotation about a single axis of rotation. Optionally, at least some of the telescopic portions include a number of telescoping members other than two, and/or at least some of the pivotal attachment points support rotation about more than a single axis of rotation. Further optionally, the base 24 is rotatably mounted to the outer roof surface of the cab 6.

Figure 3:
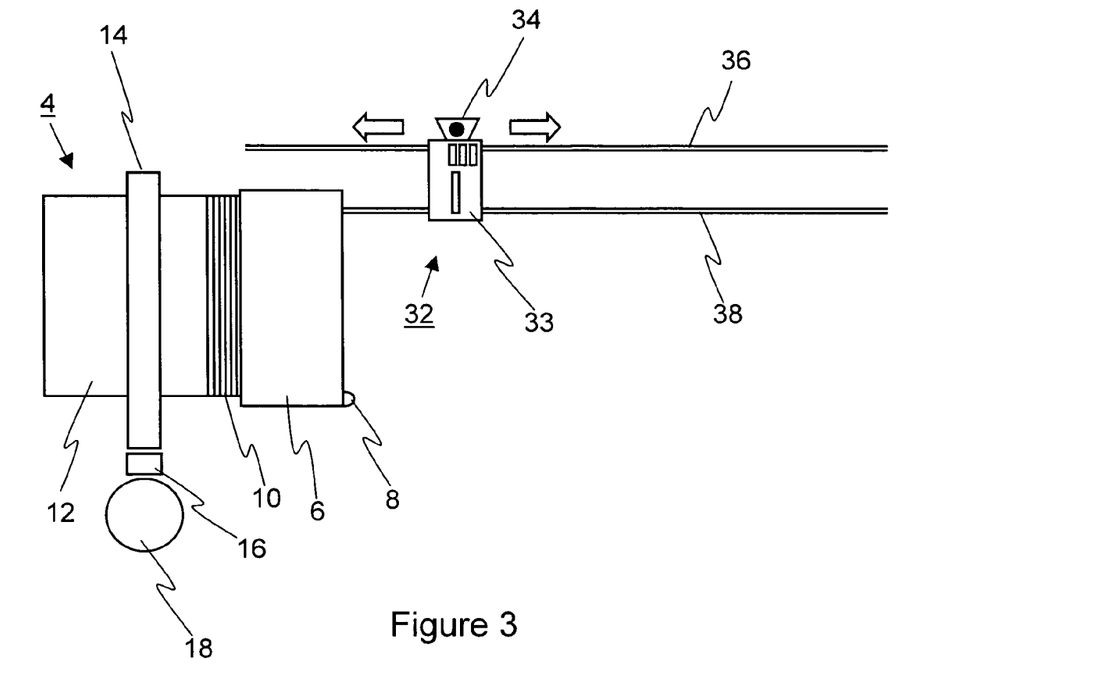
FIG. 3 is a simplified side view of an apparatus according to a second embodiment of the instant invention.

Referring now to FIG. 3, shown is a simplified side view of an apparatus according to a second embodiment of the instant invention. Elements labeled with the same numerals have the same function as those illustrated in FIG. 1. A visual guidance docking system 32 including a display portion 33 and an imager 34 is slidably mounted to upper and lower tracks 36 and 38, respectively. The tracks 36, 38 are mounted to one of an outer wall surface of a terminal building (not shown) and a structure separate from the terminal building. The visual guidance docking system 32 is moveable between first and second positions along the tracks 36, 38, which correspond approximately to the range of motion of the passenger loading bridge 4 in a direction parallel to the tracks 36, 38. Preferably, the visual guidance docking system 32 is mounted at a predetermined height to allow pilots aboard a wide variety of aircraft types to have an unobstructed view of the visual guidance docking system 32.

Visual guidance docking systems are known in the art. Typically, the prior art visual guidance docking systems are fixed at a predetermined position, for instance along a wall of a terminal building at a point that is generally aligned with a lead-in line painted onto the tarmac. An imager captures a series of images of the aircraft during its approach to the gate area. The images are used to determine whether or not the aircraft is following the lead-in line and to determine the distance remaining to an expected stop position. For instance, image processing is used to compare the actual position of the aircraft nose gear to the expected stop position. A graphical display device is used to provide instructions to the pilot. For instance, the length of a vertical bar indicates distance remaining to the expected stop position, whilst a pictorial representation of an aircraft represents lateral displacement of the aircraft from the lead-in line. Of course, other display types are known. Accordingly, the pilot is able to park the aircraft precisely based on the directions of the visual guidance docking system, without being able to observe directly the markings on the tarmac.

Figure 4:
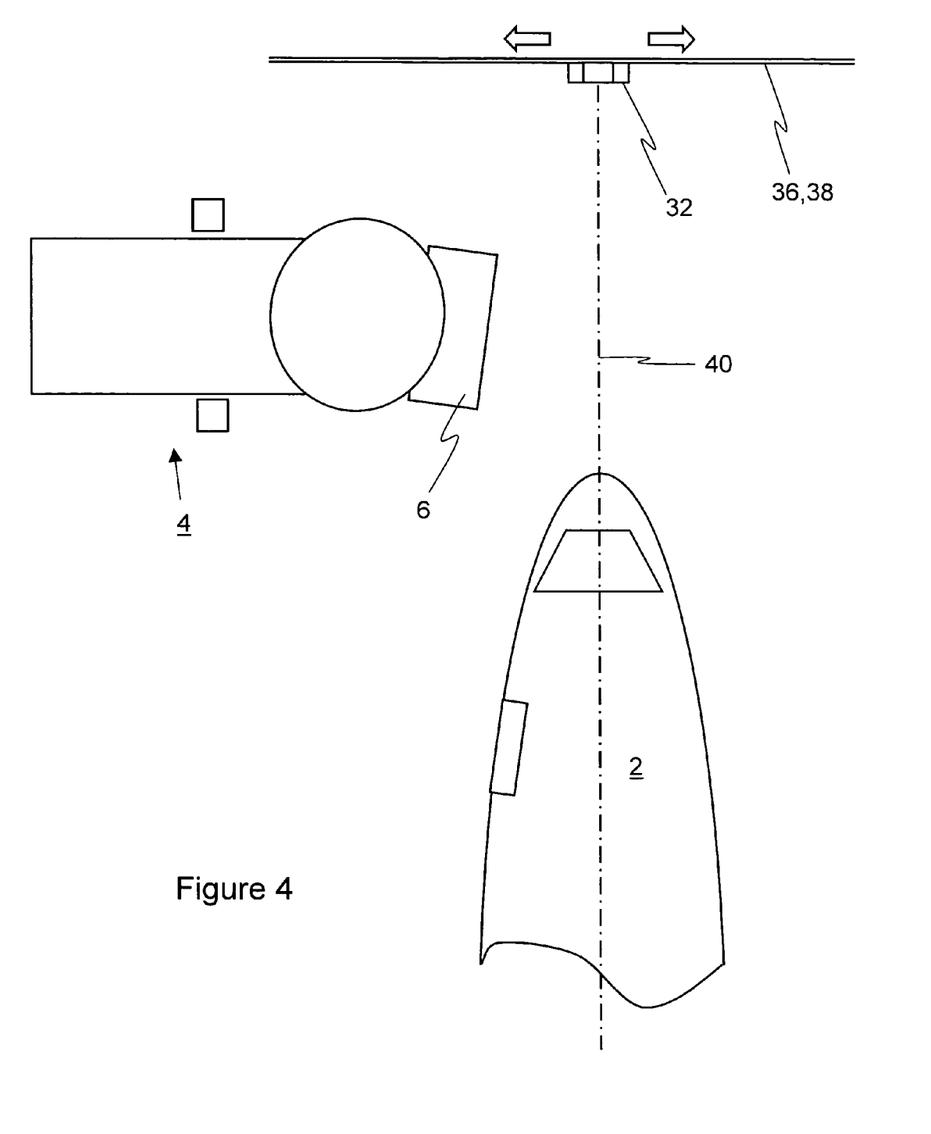
FIG. 4 is a simplified top view of the apparatus shown in FIG. 3.

Referring now to FIG. 4, shown is a simplified top view of the apparatus described with reference to FIG. 3. A controller (not shown) is provided for positioning the visual guidance docking system 32 at a position along the tracks 36, 38, which corresponds to an imaginary lead-in line 40 for leading the aircraft 2 toward a final parking position adjacent the cab 6 of passenger loading bridge 4. In this case, the lead-in lines and stop lines are known only to the controller, and the pilot relies entirely upon instructions from the visual guidance docking system 32 to park the aircraft 2. Of course, the imaginary lead-in line 40 is different for each type of aircraft 2 given a particular location of the cab 6. Furthermore, the imaginary lead-in line 40 for a particular type of aircraft 2 is different each time the location of the cab 6 is changed.

Optionally, the visual guidance docking system 32 is slidably mounted using a number of tracks other than two. Of course, other methods for mounting the visual guidance docking system 32 may also be envisaged, such as for instance using cables, adjustable arms etc. Further optionally, the display portion 33 of the visual guidance docking system 32 is fixedly mounted within the gate area, and only the imager 34 is moveable. When the display portion 33 is fixedly mounted, then the pilot views the display portion 33 at an angle that is related to the approach path of the aircraft. Further optionally, the imager 34 is also fixed.

Figure 5A:
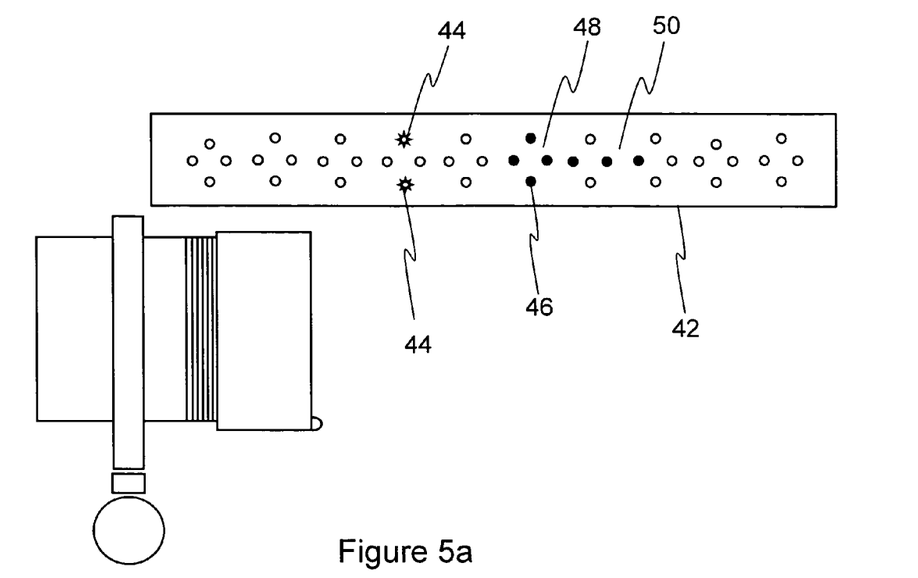
FIG. 5a is a simplified side view of an apparatus according to a third embodiment of the instant invention.

Referring now to FIG. 5a, shown is a simplified side view of an apparatus according to a third embodiment of the instant invention. Elements labeled with the same numerals have the same function as those illustrated in FIG. 1. According to the third embodiment, the slidable visual guidance docking system 32 is replaced by a stationary visual guidance docking system in the form of a series of lights 42 that are disposed along an outer wall surface of a terminal building (not shown). Optionally, the lights 42 are mounted to a structure separate from the terminal building. Of course, an imager (not shown) is provided for sensing the aircraft during its approach to the gate area. For instance, the imager captures a series of images of the approaching aircraft, and the images are used to determine whether or not the aircraft is following an imaginary lead-in line to a final parking position. For instance, image processing is used to compare the actual position of the aircraft nose gear to the final parking position.

Preferably, the lights 42 include a plurality of individual light sources. As shown in FIG. 5a, the individual light sources are arranged into three rows separated vertically one from the other. The middle row includes approximately twice as many individual light sources compared to either one of the upper row and the lower row. A controller in communication with the imager and with the passenger loading bridge is provided for selectively illuminating the individual light sources to produce human intelligible patterns. As shown in FIG. 5a, certain individual light sources 44 may be caused to flash on and off to indicate, for example, the position of an imaginary aircraft centerline for the expected stop position. A pilot may use the flashing light sources 44 as a beacon for steering the aircraft, especially during the early phase of an alignment operation. Furthermore, certain other individual light sources may be selectively illuminated, as represented by source 46, to form a human intelligible pattern in the form of an arrow having a direction indicating head portion 48 and a distance indicating tail portion 50. As illustrated in FIG. 5a, the arrowhead portion 48 is instructing the pilot to steer left, as the aircraft has strayed toward the right-hand side of the imaginary lead-in line. Furthermore, the tail portion 50 indicates that a relatively large steering correction is required.

Figure 5B:
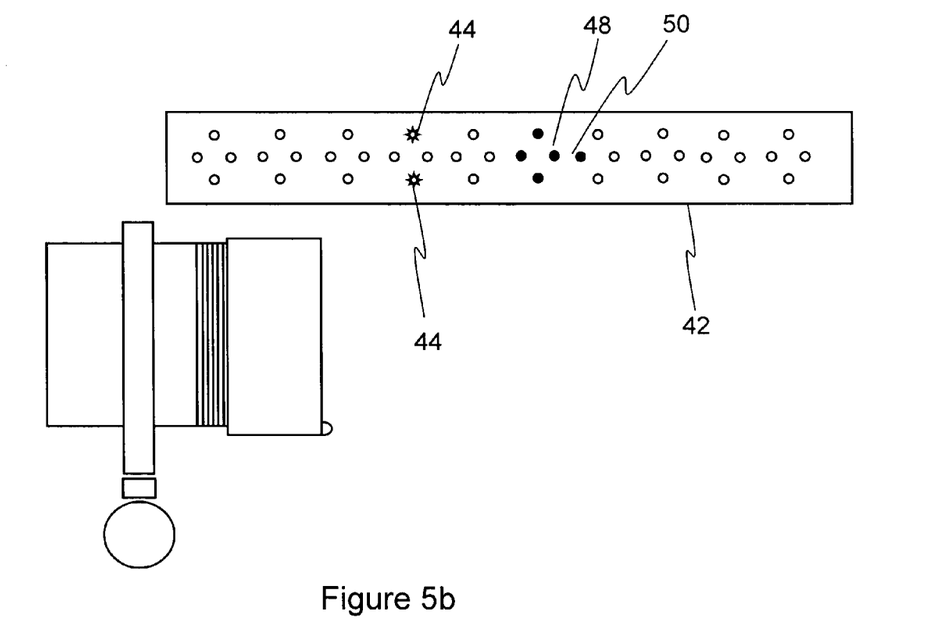
FIG. 5b is a simplified side view of the apparatus of FIG. 5a after the pilot has partially corrected the course of the aircraft.

Referring now to FIG. 5b, shown is a simplified side view of the apparatus of FIG. 5a after the pilot has partially corrected the course of the aircraft. Elements labeled with the same numerals have the same function as those illustrated in FIG. 5a. The arrowhead 48 is still instructing the pilot to steer left, but the length of the tail portion 50 is reduced to indicate that a only a relatively small steering correction is required.

Figure 5C:
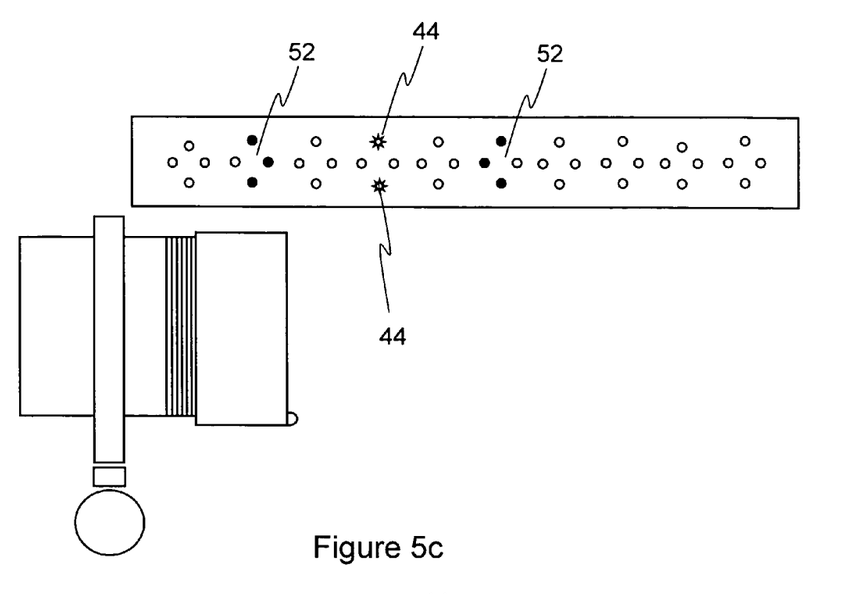
FIG. 5c is a simplified side view of the apparatus of FIG. 5a after the pilot has fully corrected the course of the aircraft.

Referring now to FIG. 5c, shown is a simplified side view of the apparatus of FIG. 5a after the pilot has fully corrected the course of the aircraft. Elements labeled with the same numerals have the same function as those illustrated in FIG. 5a. For example, two chevron shaped patterns of individual light sources are illuminated at equal distances from the flashing centerline indicators 44. Such a pattern of lights instructs the pilot to continue along a present course until instructed to stop.

Figure 5D:
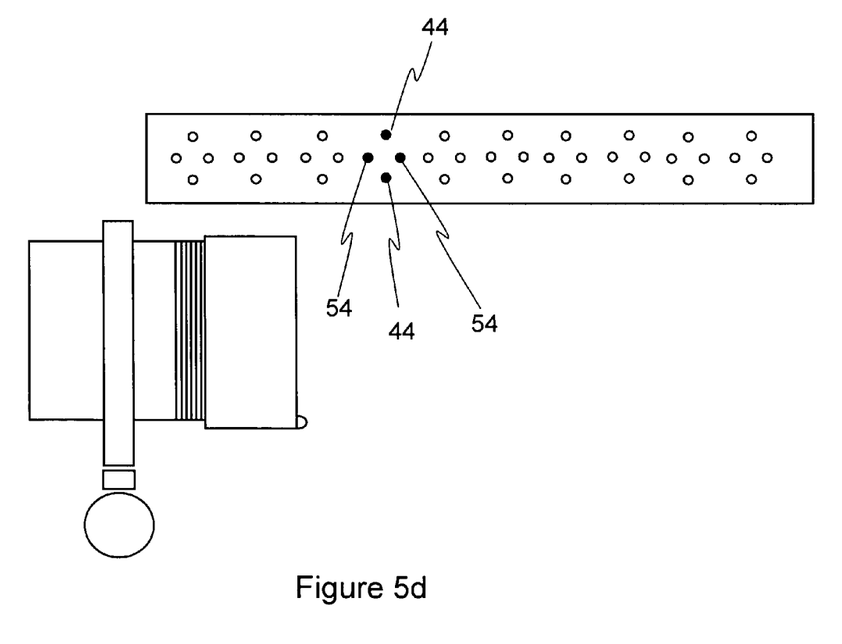
FIG. 5d is a simplified side view of the apparatus of FIG. 5a after the pilot has taxied the aircraft to the final parking position.

Referring now to FIG. 5d, shown is a simplified side view of the apparatus of FIG. 5a after the pilot has taxied the aircraft to the final parking position. Elements labeled with the same numerals have the same function as those illustrated in FIG. 5a. For example, the flashing centerline indicators 44 are now continuously illuminated and two adjacent individual light sources 54 are illuminated to produce a diamond-shaped pattern to indicate that the aircraft has stopped at the correct parking position. Optionally, the controller causes the entire diamond-shaped pattern to flash in the event that the pilot reacts slowly to a stop instruction and overshoots the parking position. Further optionally, the imager provides information to the controller for adjusting the position of the passenger loading bridge to compensate for any mis-parking of the aircraft.

Of course, other variations to the light signals are envisaged. For instance, the centerline indicators 44 could be made to flash at a rate that is related to the distance remaining to the final parking position. As the distance to the final parking position decreases, the flash rate of the centerline indicators 44 is increased. Optionally, the individual light sources are switchable between at least two colours. Most preferably, the individual light sources are switchable between three colours. For instance, the centerline indicators 44 are illuminated in a green colour, either flashing or solid, to indicate that a sensed speed of the aircraft is within a predetermined safe range of speeds. Yellow illumination of the centerline indicators 44 is used to indicate that the aircraft is approaching the upper limit of the predetermined safe range of speeds, and to instruct the pilot to reduce the speed of the aircraft accordingly. Furthermore, red illumination is used to instruct the pilot to bring the aircraft to an immediate halt. Of course, as the aircraft nears the passenger loading bridge, the controller automatically reduces the upper limit of the predetermined safe range of speeds, such that when the aircraft is very close to the final parking position, a yellow signal will be illuminated at very low taxiing speeds. Advantageously, the pilot will be able to stop the aircraft very quickly when the red light pattern is illuminated, since the aircraft is already moving very slowly when it has moved close to the expected parking position.

Of course, the lighting arrays 42 described with reference to FIGS. 5a to 5d are intended to be for illustrative purposes only. It is envisaged that different numbers of rows and columns of individual light sources could be used and that patterns other than the ones described above could be created. The individual light sources include light emitting diodes (LEDs), conventional incandescent and/or fluorescent lights, etc. In addition, words or other symbols could be presented for directing the pilot of the aircraft.

Figure 6:
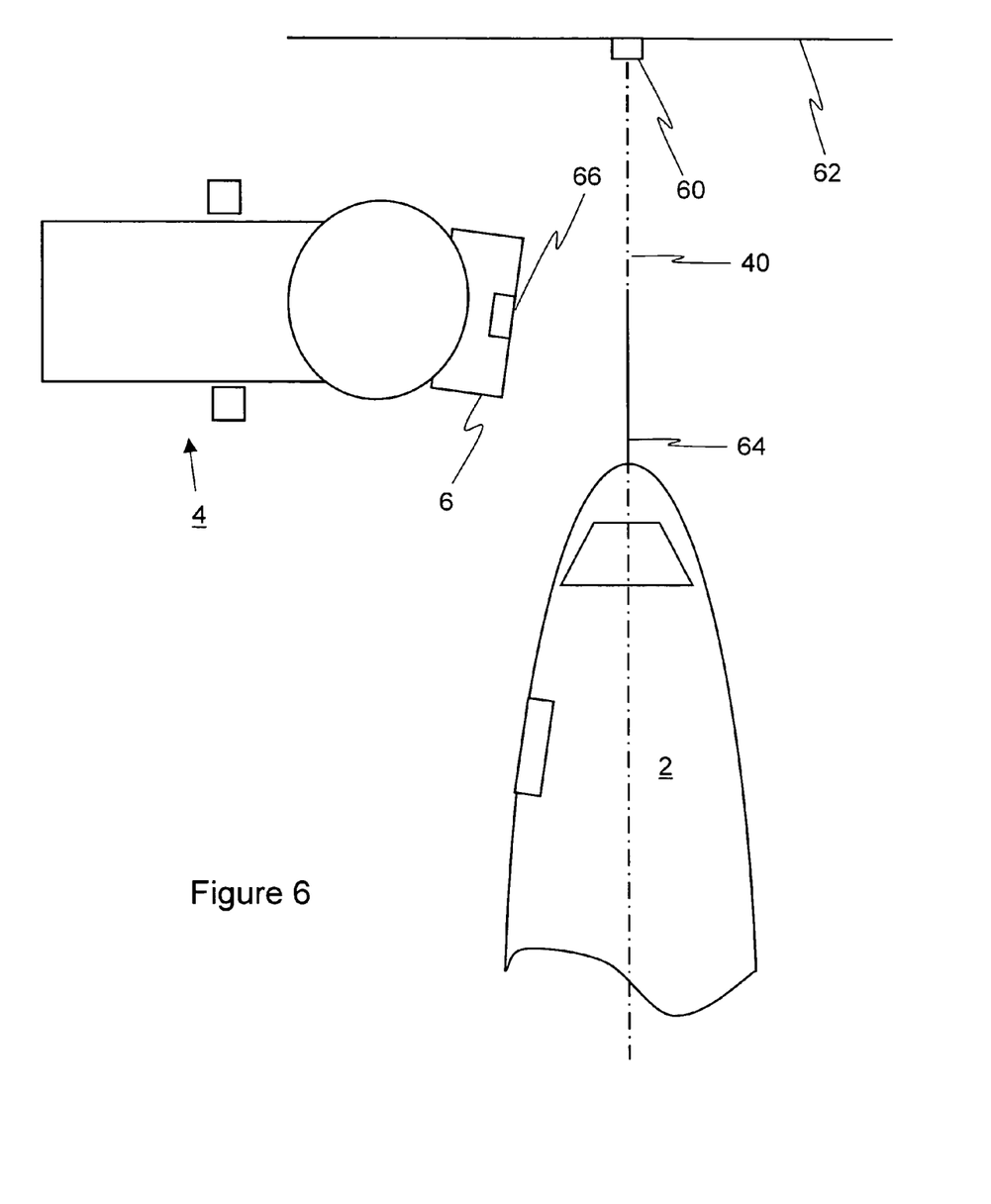
FIG. 6 is a simplified top view of an apparatus according to a fourth embodiment of the instant invention.

Referring now to FIG. 6, shown is a simplified top view of an apparatus according to a fourth embodiment of the instant invention. Elements labeled with the same numerals have the same function as those illustrated in FIG. 4. According to the fourth embodiment, a laser light source 60 is mounted to an outer wall surface 62 of an airport terminal building. Optionally, the laser light source 60 is mounted to a portion of the passenger loading bridge 4 or to a separate support structure (not shown). The laser light source 60 is for emitting laser light to project human intelligible markings onto the tarmac surface, such as for instance a non-permanent lead-in line 64, shown as a thick solid line that is superimposed upon the imaginary centerline 40. Advantageously, the position of the non-permanent lead-in line 64 is easily changed simply by moving the laser light source 60 to a different position in dependence upon a desired final parking position of the aircraft. Optionally, the laser light is emitted along a different optical path and the laser light source 60 remains stationary. Further optionally, an imager 66 is provided for sensing a position of the aircraft and for providing a signal to a controller in dependence upon the sensed position. The controller is for sending a signal to the laser light source to change the position of the non-permanent lead-in line 64.

Optionally, the laser light source 60 is used in cooperation with an apparatus according to any one of the first, second and third embodiments of the instant invention. For example, the laser light source 60 is used to project a non-permanent lead-in line for use by a pilot to guide an aircraft 2 toward the passenger loading bridge 4, and the final movements of the aircraft 2 are performed so as to position the wand 22 directly in front of the pilot's windshield, as was described with reference to FIGS. 1 and 2.

Figure 7:
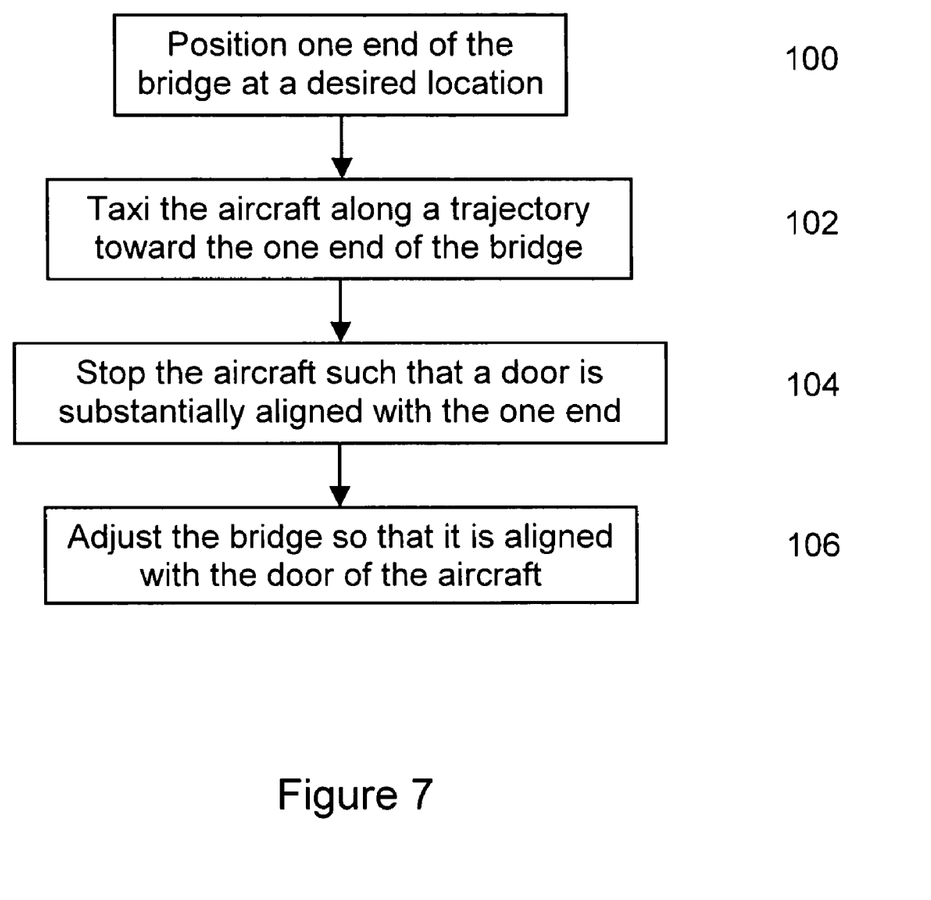
FIG. 7 is a simplified flow diagram of a method according to instant invention for aligning an aircraft with a passenger loading bridge.

Referring now to FIG. 7, shown is a simplified flow diagram of a method according to a broad aspect of the instant invention for aligning an aircraft with a passenger loading bridge. At step 100, one end of the passenger loading bridge is positioned at a desired location. In particular, the passenger loading bridge is adjusted such that the cab 6 is located adjacent to a desired final parking position for an aircraft. Preferably, step 100 is performed whenever it is advantageous to select a different final parking position. For example, step 100 is performed at the beginning of every alignment operation, on a daily basis, or several times during a same operating day. Optionally, step 100 is performed one time only, for instance during an initial setup of the passenger loading bridge, and the aircraft of a same type always stop at a same final parking position.

At step 102, the aircraft is taxied along a trajectory toward the one end of the passenger loading bridge. The trajectory is affected by the instantaneous position of the one end of the passenger loading bridge. Accordingly, a same type of aircraft may follow a different trajectory to a different final parking position to align with a same passenger loading bridge during different alignment operations. Optionally, the aircraft is towed along the trajectory using a tractor or a tug.

At step 104 the aircraft is stopped such that a door of the aircraft is substantially aligned with the one end of the passenger loading bridge. Preferably, the aircraft stops at a position such that a final adjustment to align the aircraft with the passenger loading bridge requires only that the passenger loading bridge be telescopically extended toward the aircraft. Preferably, the passenger loading bridge requires an adjustment in a direction toward the aircraft of between 0.5 meters to 3 meters. Most preferably, the passenger loading bridge requires a telescopic extension of less than 1 meter more than a clearance for opening the aircraft doorway.

At step 106 the passenger loading bridge is adjusted so that it is aligned with the door of the aircraft. As described above, most preferably, the passenger loading bridge requires only a telescopic extension of less than 1 meter more than a clearance for opening the aircraft doorway. Of course, additional horizontal and vertical adjustments, as well as angular adjustment of the cab floor member, may also be required to achieve an acceptable seal against the aircraft fuselage. Advantageously, the final adjustment that is performed at step 106 is small compared to the adjustment performed using the prior art systems described supra. Accordingly, the risk of colliding with ground service vehicles and personnel is reduced compared to the prior art systems. Furthermore, as the bridge is moving only a small distance during the final adjustment, it is possible to move the bridge slowly without unacceptably affecting the connection time. Of course, by moving the bridge slowly compared to the prior art systems, less damage is expected to occur in the event of a collision with the aircraft or with a ground service vehicle.

Optionally, step 104 of stopping the aircraft such that a door of the aircraft is substantially aligned with the one end of the passenger loading bridge includes the step of providing a human intelligible indication for indicating a final parking position of the aircraft. In particular, the indication is dependant upon the position of the one end of the passenger loading bridge.

Figure 8:
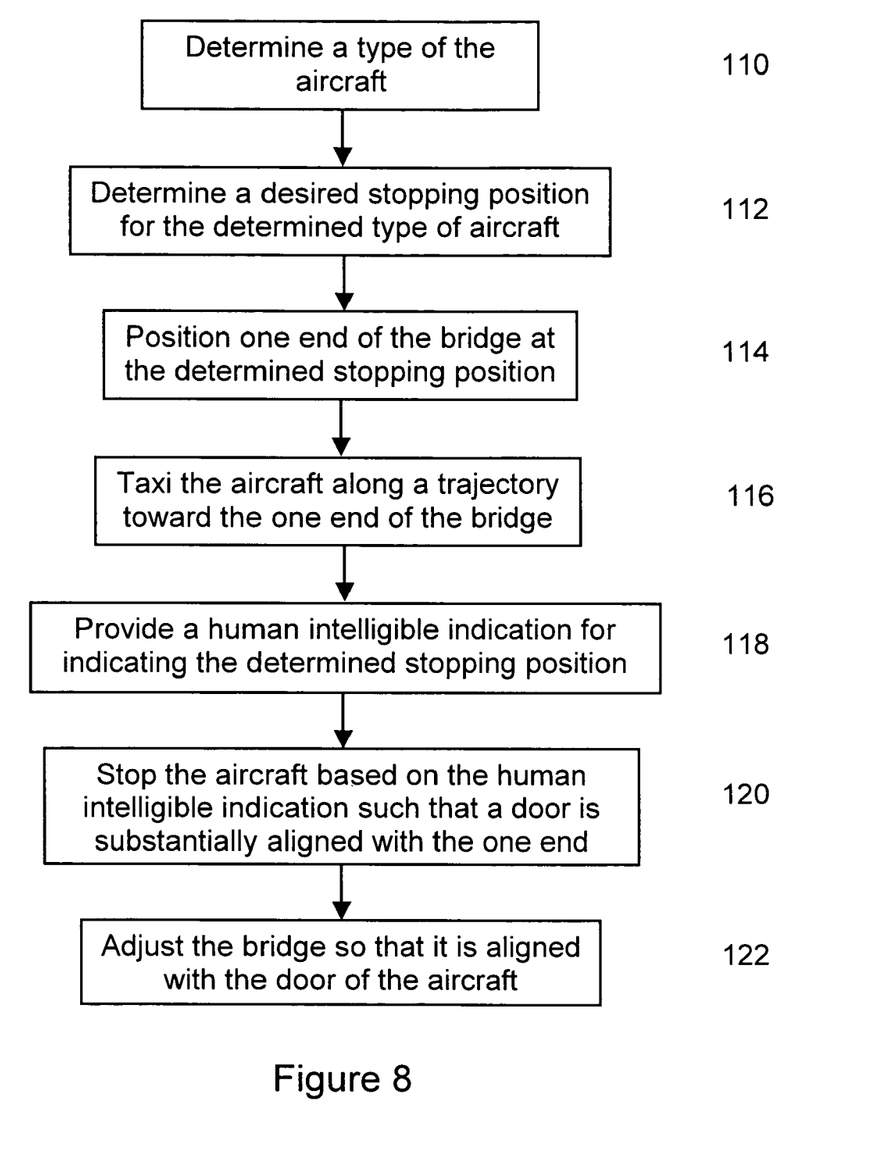
FIG. 8 is a simplified flow diagram of another method according to the instant invention for aligning an aircraft with a passenger loading bridge.

Referring now to FIG. 8, shown is a simplified flow diagram of another method according to the instant invention for aligning an aircraft with a passenger loading bridge. At step 110 a type of the aircraft is determined and provided to a controller of the bridge alignment system, for instance a computer in electrical communication with one each of an automated bridge drive system and an alignment indicator. For example, the type of the aircraft is provided to the controller from a flight information database of the airport terminal building. As flight plans and gate assignments are known in advance of an aircraft actually arriving at a particular gate, this type of information is generally readily available within an airport environment. Optionally, a human operator provides the type of the aircraft via a keypad or another data input device that is in communication with the bridge controller. Further optionally, sensors associated with the bridge controller are used to image the aircraft as it approaches its assigned gate, and image processing is performed to determine the type of the aircraft. Of course, various combinations of the above methods for determining the type of the aircraft may be used in order to ensure that the aircraft is not misidentified.

Once the aircraft has been identified, a final parking position for the aircraft is determined at step 112. The final parking position is determined taking into account factors such as the size and maneuverability of the determined type of the aircraft, ground servicing requirements of the determined type of the aircraft, and the layout of the apron and associated support systems. At step 114, the controller positions the one end of the bridge at the determined parking position. At step 116 the aircraft is taxied along a trajectory toward the one end of the passenger loading bridge. The trajectory is affected by the position of the one end of the passenger loading bridge, such that for separate alignment operations a same type of aircraft may follow a different trajectory to a different final parking position to align with a same passenger loading bridge. Optionally, the aircraft is towed along the trajectory using a tractor or a tug.

As the aircraft continues to taxi toward the one end of the passenger loading bridge, the alignment indicator is used at step 118 to provide a human intelligible indication for indicating the final parking position of the aircraft. In particular, the indication is dependant upon the position of the one end of the passenger loading bridge. For instance, the controller moves the wand 22 of FIG. 1 to a predetermined position relative to the one end of the passenger loading bridge for the determined type of the aircraft. The pilot guides the aircraft toward the wand such that a reference point on the aircraft, for instance the cockpit windshield, closely approaches the wand. When the wand includes a compact display device, then the controller selectively illuminates or otherwise displays symbols, such as directional arrows, for providing additional instructions to the pilot. A similar step is performed when the alignment indicator is provided in a different form, such as one of the visual guidance docking systems described with reference to FIGS. 3 to 5d.

At step 120 the aircraft is stopped such that a door to which the passenger loading bridge is to be connected is substantially aligned with the one end of the passenger loading bridge. Preferably, the aircraft stops at a position such that the final adjustment to align the aircraft with the passenger loading bridge requires only that the passenger loading bridge be telescopically extended toward the aircraft. Preferably, the passenger loading bridge requires a final adjustment toward the aircraft of between 0.5 meters to 3 meters. Most preferably, the passenger loading bridge requires a final adjustment toward the aircraft of less than 1 meter more than a clearance for opening the aircraft doorway. Typically, the aircraft door is not within the pilot's field of view, and as such the pilot relies entirely upon the human intelligible indication to stop the aircraft at the final parking position.

At step 122 the passenger loading bridge is adjusted so that it is aligned with the door of the aircraft. As described above, most preferably, the passenger loading bridge requires only a final adjustment toward the aircraft of less than 1 meter more than a clearance for opening the aircraft doorway. Of course, additional horizontal vertical, as well as angular adjustment of the cab floor member may also be required to achieve a weather-tight seal against the aircraft fuselage. Advantageously, the final adjustments that are performed at step 106 are small compared to the adjustments performed using the prior art systems described supra. Accordingly, the risk of colliding with ground service vehicles and personnel is reduced compared to the prior art systems. Furthermore, as the bridge is moving only a small distance, it is possible to move the bridge slowly without adversely affecting the connection time. Of course, by moving the bridge slowly compared to the prior art systems, less damage is expected to occur in the event of a collision with the aircraft or a ground service vehicle.

Figure 9:
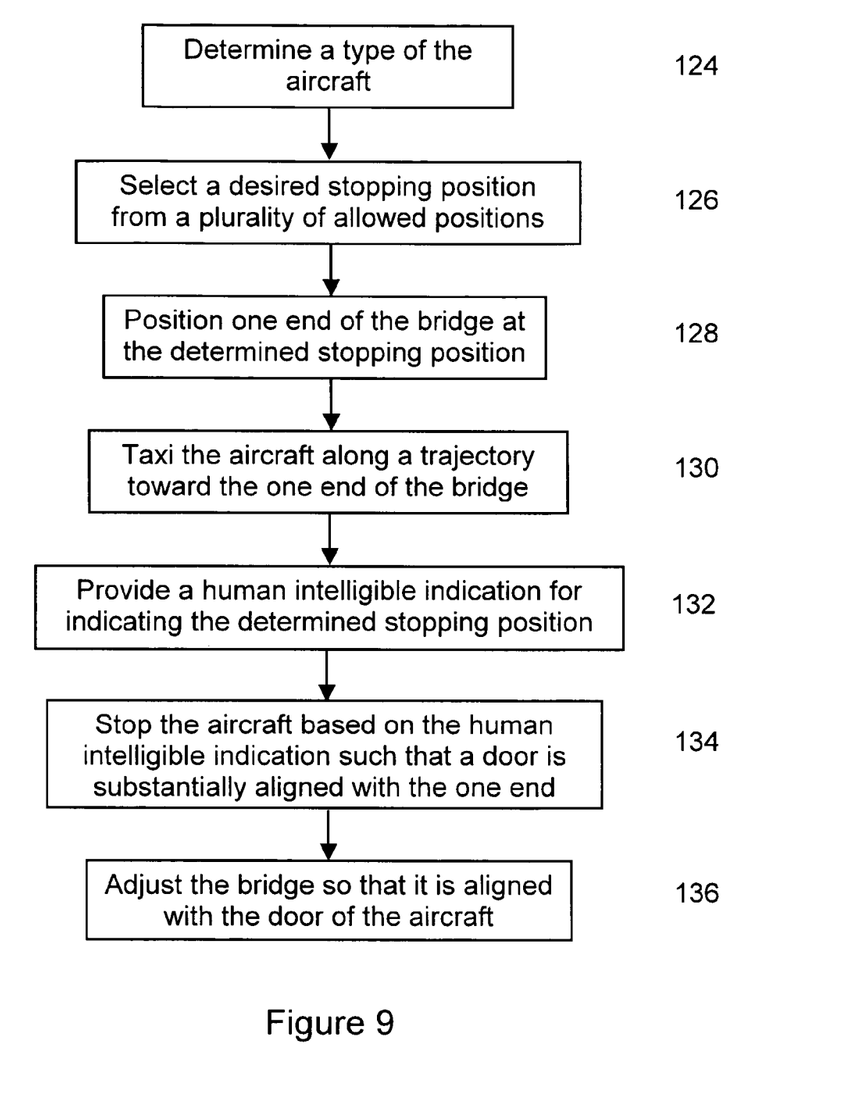
FIG. 9 is a simplified flow diagram of another method according to the instant invention for aligning an aircraft with a passenger loading bridge.

Referring now to FIG. 9, shown is a simplified flow diagram of another method according to the instant invention for aligning an aircraft with a passenger loading bridge. At step 124 a type of the aircraft is determined and provided to a controller of the bridge alignment system, such as for instance a computer in electrical communication with one each of an automated bridge drive system and an indicating device. For example, the type of the aircraft is provided to the controller from a flight information database of the airport terminal building. As flight plans and gate assignments are known well in advance of an aircraft actually arriving at a particular gate, this type of information is generally readily available. Optionally, a human operator provides the type of the aircraft via a keypad or another data input device that is in communication with the bridge controller. Further optionally, sensors associated with the bridge controller are used to image the aircraft as it approaches its assigned gate, and image processing is performed to determine the type of the aircraft in time to determine a desired final parking position for the approaching aircraft. Of course, combinations of the above methods for determining the type of the aircraft may be used in order to ensure that the aircraft is not misidentified.

Once the aircraft has been identified, a desired parking position for the aircraft is determined at step 126. The desired parking position for the aircraft is selected from a plurality of allowed positions for the determined type of the aircraft.

At step 128, the controller positions the one end of the bridge at the determined parking position. At step 130, the aircraft is taxied along a trajectory toward the one end of the passenger loading bridge. The trajectory is determined by the position of the one end of the passenger loading bridge, such that for separate alignment operations a same type of aircraft may follow a different trajectory to a different final parking position to align with a same passenger loading bridge. Optionally, the aircraft is towed along the trajectory using a tractor or a tug.

As the aircraft continues to taxi toward the one end of the passenger loading bridge, the alignment indicator is used at step 132 to provide a human intelligible indication for indicating the final parking position of the aircraft. In particular, the indication is dependant upon the position of the one end of the passenger loading bridge. For instance, the controller moves the wand 22 of FIG. 1 to a predetermined position relative to the one end of the passenger loading bridge for the determined type of the aircraft. The pilot guides the aircraft toward the wand such that a reference point on the aircraft, for instance the cockpit windshield, closely approaches the wand. When the wand includes a compact display device, then the controller selectively illuminates or otherwise displays symbols, such as directional arrows, for providing additional instructions to the pilot. A similar step is performed when the alignment indicator is provided in a different form, such as one of the visual guidance docking systems described with reference to FIGS. 3 to 5*d*.

At step 134 the aircraft is stopped such that a door to which the passenger loading bridge is to be connected is substantially aligned with the one end of the passenger loading bridge. Preferably, the aircraft stops at a position such that the final adjustment to align the aircraft with the passenger loading bridge requires only that the passenger loading bridge be telescopically extended toward the aircraft. Preferably, the passenger loading bridge requires an adjustment in a direction toward the aircraft of between 0.5 meters to 3 meters. Most preferably, the passenger loading bridge requires an adjustment in a direction toward the aircraft of less than 1 meter more than a clearance for opening the aircraft doorway. Typically, the aircraft door is not within the pilot's field of view, and as such the pilot relies entirely upon the human intelligible indication to stop the aircraft at the final parking position.

At step 136, the passenger loading bridge is adjusted so that it is aligned with the door of the aircraft. As described above, most preferably, the passenger loading bridge requires only an adjustment in a direction toward the aircraft of less than 1 meter more than a clearance for opening the aircraft doorway. Of course, additional horizontal and vertical, as well as angular adjustment of the cab floor member, may also be required to achieve a weather-tight seal against the aircraft fuselage. Advantageously, the final adjustments that are performed at step 106 are small compared to the adjustments performed using the prior art systems described supra. Accordingly, the risk of colliding with ground service vehicles and personnel is reduced compared to the prior art systems. Furthermore, as the bridge is moving only a small distance, it is possible to move the bridge slowly without adversely affecting the connection time. Of course, by moving the bridge slowly compared to the prior art systems, less damage is expected to occur in the event of a collision with the aircraft or a ground service vehicle.

According to the embodiments of the instant invention disclosed supra, the final parking position of the aircraft is dictated by the position of the aircraft-engaging end of the passenger loading bridge, and not by a series of permanent lines and markings painted onto the tarmac surface. To this end, the instant invention provides an alignment indicator for indicating a final parking position of the aircraft, the alignment indicator working cooperatively with the aircraft-engaging end of the passenger loading bridge.

It is an advantage of the instant invention that the distance between the aircraft-engaging end of the passenger loading bridge and the door of the aircraft is small after the aircraft has stopped at its final parking position. Accordingly, the final connection time is correspondingly small. It is a further advantage of the instant invention that a relatively simple automated or semi-automated system may be used to perform the final connection. For instance, it is a relatively straightforward procedure to identify the door of the aircraft and to move the bridge into alignment therewith from a distance of approximately 0.5 meters to 3 meters, compared to starting from 10 to 20 meters away. It is still a further advantage of the instant invention that the risk to ground crews and ground service equipment is greatly reduced, as the passenger loading bridge moves only a relatively short distance, for example approximately 0.5 meters to 3 meters. It is yet another advantage of the instant invention that aircraft of different types may approach the passenger loading bridge along different virtual lead-in lines, and/or aircraft of a same type may approach the passenger loading bridge along different virtual lead-in lines. Accordingly, the pilot does not rely upon permanent markings disposed along the tarmac surface, which are easily obscured by snow, rubbed off, etc.

Numerous other embodiments may be envisaged without departing from the spirit and scope of the invention.

What is claimed is:

1. A system for aligning a passenger loading bridge to a doorway of an aircraft comprising:
   a passenger loading bridge having an aircraft-engaging end for being aligned with the doorway of the aircraft;
   an alignment indicator comprising an active indicating device comprising a wand for displaying a human intelligible indication for indicating a stopping position of the aircraft; and,
   a controller in electrical communication with the passenger loading bridge and with the alignment indicator for determining a human intelligible indication to be displayed by the alignment indicator in dependence upon a location of the aircraft-engaging end of the passenger loading bridge,
   wherein the stopping position of an aircraft of a same type changes with changes in the location of the aircraft-engaging end of the passenger loading bridge.

2. A system according to claim 1, including an adjustable support arm for positioning the wand.

3. A system according to claim 1, wherein the active indicating device includes a laser light source for emitting laser light to form an image for conveying information to an operator of the aircraft, the information for guiding the aircraft toward the stopping position.

4. A system for aligning a passenger loading bridge to a doorway of an aircraft, comprising:
   a passenger loading bridge comprising a cab for being aligned with a doorway of an aircraft;
   an indicating device attached to a surface of the passenger loading bridge, the indicating device comprising an indicator portion comprising a wand that is positionable at a predetermined location relative to the cab of the passenger loading bridge for indicating a stopping position of the aircraft; and,
   a controller in communication with the indicating device for controllably adjusting the indicator portion of the indicating device to the predetermined location for indicating the stopping position of the aircraft,
   wherein the stopping position of an aircraft of a same type varies with changes in the location of the cab of the passenger loading bridge.

5. A system according to claim 4, wherein the indicating device is attached to a surface of the passenger loading bridge near an aircraft engaging end thereof.

6. A system according to claim 4, wherein the indicating device is attached to an outer surface of the passenger loading bridge.

7. A system according to claim 4, wherein the indicating device is attached to an outer roof surface of the cab.

8. A system according to claim 4, wherein the indicator portion of the indicating device is positionable at different locations relative to the cab of the passenger loading bridge.

9. A system according to claim 4, wherein the wand comprises a tip that is at least one of soft and flexible.

10. A system according to claim 4, wherein the wand is at least one of brightly colored and illuminable.

11. A system according to claim 4, wherein the indicator portion of the indicating device comprises a compact display device for providing human intelligible signals.

12. A system according to claim 4, wherein the indicating device comprises a support portion having a first end and a second end opposite the first end, the first end being attached to the surface of the passenger loading bridge and the second end for supporting the indicator portion.

13. A system according to claim 12, wherein the support portion comprises an adjustable robotic arm.

14. A system for aligning a passenger loading bridge to a doorway of an aircraft, comprising:
- a passenger loading bridge comprising a cab for being aligned with a doorway of an aircraft;
- a visual guidance docking system comprising a display portion mounted at a location remote from the passenger loading bridge, the display portion being configurable for displaying a human intelligible indication for guiding the aircraft toward a final parking position that is adjacent to the cab of the passenger loading bridge, such that the human intelligible indication is approximately aligned with an imaginary lead-in line associated with a current location of the cab of the passenger loading bridge; and,
- a controller in communication with the visual guidance docking system for determining the human intelligible indication to be displayed by the display portion in dependence upon the current location of the cab of the passenger loading bridge, wherein an aircraft of a same type is guided toward a different final parking position for each different location of the cab of the passenger loading bridge, and, wherein the display portion is dynamically re-configurable such that the human intelligible indication is approximately alignable with a different imaginary lead-in line for an aircraft of a same type, the different imaginary lead-in line being associated with the different location of the cab of the passenger loading bridge.

15. A system according to claim 14, wherein at least the display portion of the visual guidance docking system is moveable in dependence upon the location of the cab of the passenger loading bridge.

16. A system according to claim 14, wherein at least the display portion of the visual guidance docking system is slidably mounted along a tack member.

17. A system according to claim 14, wherein the visual guidance docking system comprises a stationary visual guidance docking system.

18. A system according to claim 17, wherein the stationary visual guidance docking system comprises a series of individual tight sources arranged in rows and columns for displaying the human intelligible indication in the form of recognizable symbols.

19. A system according to claim 18, wherein each individual light source of the series of individual light sources comprises a light emitting diode.

20. A system according to claim 18, wherein the stationary visual guidance docking system comprises at least three rows of individual light sources.

21. A system according to claim 14, wherein the visual guidance docking system comprises a stationary visual guidance docking system comprising a series of individual light sources arranged in rows and columns for displaying the human intelligible indication in the form of recognizable symbols.

22. A system for aligning a passenger loading bridge to a doorway of an aircraft, comprising:
- a passenger loading bridge including a cab for being aligned with a doorway of an aircraft;
- a visual guidance docking system including a display portion mounted at a location remote from the passenger loading bridge, the display portion for displaying a human intelligible indication for guiding the aircraft toward a final parking position adjacent to the cab of the passenger loading bridge; and,
- a controller in communication with the visual guidance docking system for determining the human intelligible indication to be displayed by the display portion in dependence upon a location of the cab of the passenger loading bridge, and for configuring the display portion for displaying the human intelligible indication at a location that is determined in dependence upon the location of the cab of the passenger loading bridge, wherein the stopping position of an aircraft of a same type varies with changes in the location of the cab of the passenger loading bridge, and, wherein the location of the human intelligible indication display varies with changes in the location of the cab of the passenger loading bridge.

23. A system according to claim 22, wherein the display portion of the visual guidance docking system is moveable in dependence upon the location of the cab of the passenger loading bridge, for varying the location of the human intelligible indication display.

24. A system according to claim 22, wherein the visual guidance docking system comprises a series of individual light sources arranged in rows and columns for displaying the human intelligible indication, and wherein the individual light sources are selectively illuminable for varying the location of the human intelligible indication display.

25. A system according to claim 24, wherein each individual light source of the series of individual light sources comprises a light emitting diode.

26. A system according to claim 24, wherein the visual guidance docking system comprises at least three rows of individual light sources.

* * * * *